United States Patent [19]

Bowman

[11] Patent Number: 5,474,631
[45] Date of Patent: Dec. 12, 1995

[54] TENSION BONDING PROCESS

[75] Inventor: Eldon L. Bowman, Simi Valley, Calif.

[73] Assignee: Northrop Grumman Corporation, Los Angeles, Calif.

[21] Appl. No.: 239,662

[22] Filed: May 9, 1994

[51] Int. Cl.$^6$ .............................. B32B 31/00; B64C 3/28
[52] U.S. Cl. ...................... 156/160; 156/212; 156/494; 244/123
[58] Field of Search ....................... 264/229, 231, 264/263; 156/494, 245, 163, 165, 212; 144/344, 346, 352; 114/82, 83; 425/111; 244/123; 269/130, 131, 132; 254/213, 216, DIG. 12, DIG. 14, DIG. 15

[56] References Cited

U.S. PATENT DOCUMENTS

| 459,921 | 9/1891 | Wyttenbach | 269/130 X |
|---|---|---|---|
| 1,103,243 | 7/1914 | Amborn | 269/130 |
| 2,379,014 | 12/1942 | Lowe | 269/130 X |
| 2,394,162 | 2/1946 | Gassner | 144/346 X |
| 2,858,875 | 11/1958 | Lyman | 156/494 |
| 2,975,092 | 3/1961 | Hagerty | 156/212 |
| 3,050,786 | 8/1962 | St. John et al. | 18/59 |
| 3,282,757 | 11/1966 | Brussee | 156/69 |
| 3,416,763 | 4/1967 | Moreno | 254/213 X |
| 3,711,934 | 1/1973 | Zorowski et al. | 29/445 |
| 4,225,372 | 9/1980 | Kinzler et al. | 156/154 |
| 4,268,332 | 5/1981 | Winders | 156/160 |
| 4,572,491 | 2/1986 | Forrer | 269/131 X |
| 4,756,351 | 7/1988 | Knutsen | 269/130 X |

OTHER PUBLICATIONS

Kinghorn, Robert C., "Repairing Wobbly and Broken Chairs," Fine Woodworking Techniques 4, Taunton Press, 1982.

Primary Examiner—Jeff H. Aftergut
Assistant Examiner—David W. Reed
Attorney, Agent, or Firm—Terry J. Anderson; Karl J. Hoch, Jr.

[57] ABSTRACT

Process for compressing a three-dimensional rigid body against a rigid adhesive-coated support member during the curing cycle of the adhesive. Spaced bands or straps of strong, non-stretchable fibers are applied over the body and through opposed openings in the adhesive-coated support member, and the opposite ends of each strap or band are engaged in adjustable tensioning members. The tensioning members are tightened to provide and maintain a predetermined pressure between the adhesive coated support member and the three-dimensional body while the adhesive is subjected to a curing cycle. In a preferred embodiment the compressed unit is assembled with other elements to be cure-bonded thereto and the assembly is united in a single cure cycle.

4 Claims, 3 Drawing Sheets

TENSION BONDING PROCESS

STATEMENT OF GOVERNMENT RIGHTS

The U.S. Government has a paid-up license in this invention and the right in limited circumstances to require the patent owner to license others on reasonable terms as provided for by the terms of contract F33657-81-C-0067 awarded by the United States Air Force.

BACKGROUND OF THE INVENTION

Field of the Invention

The present invention relates to the bonding of three-dimensional bodies, such as reinforcement plugs, to the flat surface of a support member, such as an antenna panel or reflector element, by means of a curable adhesive. The invention also relates to the bonding of the plug-supporting support member to the surface of a core member or housing having plug-receiving recesses, to form an assembly such as a wing leading edge antenna or reflector assembly which is strengthened against separation of the core member surface from the surface of the reflector element.

It is known to pre-bond three-dimensional bodies such as reinforcement plugs to a flat support surface by means of curable adhesives, applying downward pressure during the adhesive cure cycle which averages about 12 hours duration. It is also known to apply pressure between the reinforcement plugs and the curable adhesive surface by means of screws, through the rear of the support member or reflector element into the plugs, to pull the plugs against the reflector surface during the first cure cycle. Alignment of the screw holes is required, and the pressure obtained is minimal at best.

Thereafter the formed plug assembly is bonded to the flat inner surface of a contoured core member having plug-receiving recesses which are sized and contoured to receive and bond to the adhesive-coated surfaces of the plugs while the flat inner surface of the core member bonds to the adhesive coating on the flat reflector surface during a second cure cycle.

The formed core assembly provides a separation-resistant assembly, such as a wing leading-edge antenna or reflector assembly in which separation-resistant bonding between the flat surfaces of the core member and the antenna assembly is provided by the plugs which extend perpendicularly outwardly from the flat reflector surface of the antenna element into the core member. Such assemblies are sufficiently strong provided that each plug element is strongly bonded to the reflector surface of the antenna element to resist separation therefrom. However, the known processes for producing such assemblies require two separate curing cycles, one for bonding the plug elements to the flat reflector surface of the antenna support member and another for bonding the plug-antenna assembly to the core member or housing to form the final assembly. Each curing cycle requires about 12 hours plus the additional labor and other costs.

SUMMARY OF THE INVENTION

The present invention relates to a novel process for providing a predetermined contact pressure between the flat surface of a three dimensional body, such as a reinforcing plug, and a curable adhesive-coated flat surface, such as an antenna or reflector surface of a support member, and for maintaining said pressure during the adhesive curing cycle.

A preferred embodiment of the present invention relates to a novel process in which the aforementioned plug-antenna assembly, uncured but under predetermined contact pressure, is assembled in pressure contact with a core member having a flat inner surface provided with plug-receiving recesses, the surface of each plug and of the antenna surface carrying a curable adhesive, and the assembly is exposed to a single cure cycle to simultaneously cure the adhesive layer bonding each plug to the portions of the antenna surface maintained under predetermined contact pressure therewith, and the curable adhesive present on the surface of each plug and on the remaining portions of the antenna or reflector surface, to produce a strongly-bonded core-antenna assembly in a single cure cycle.

The objectives advantages and various embodiments of the present invention are further clarified by the following description, including the drawings in which:

THE DRAWINGS

DETAILED DESCRIPTION

Figure 1:
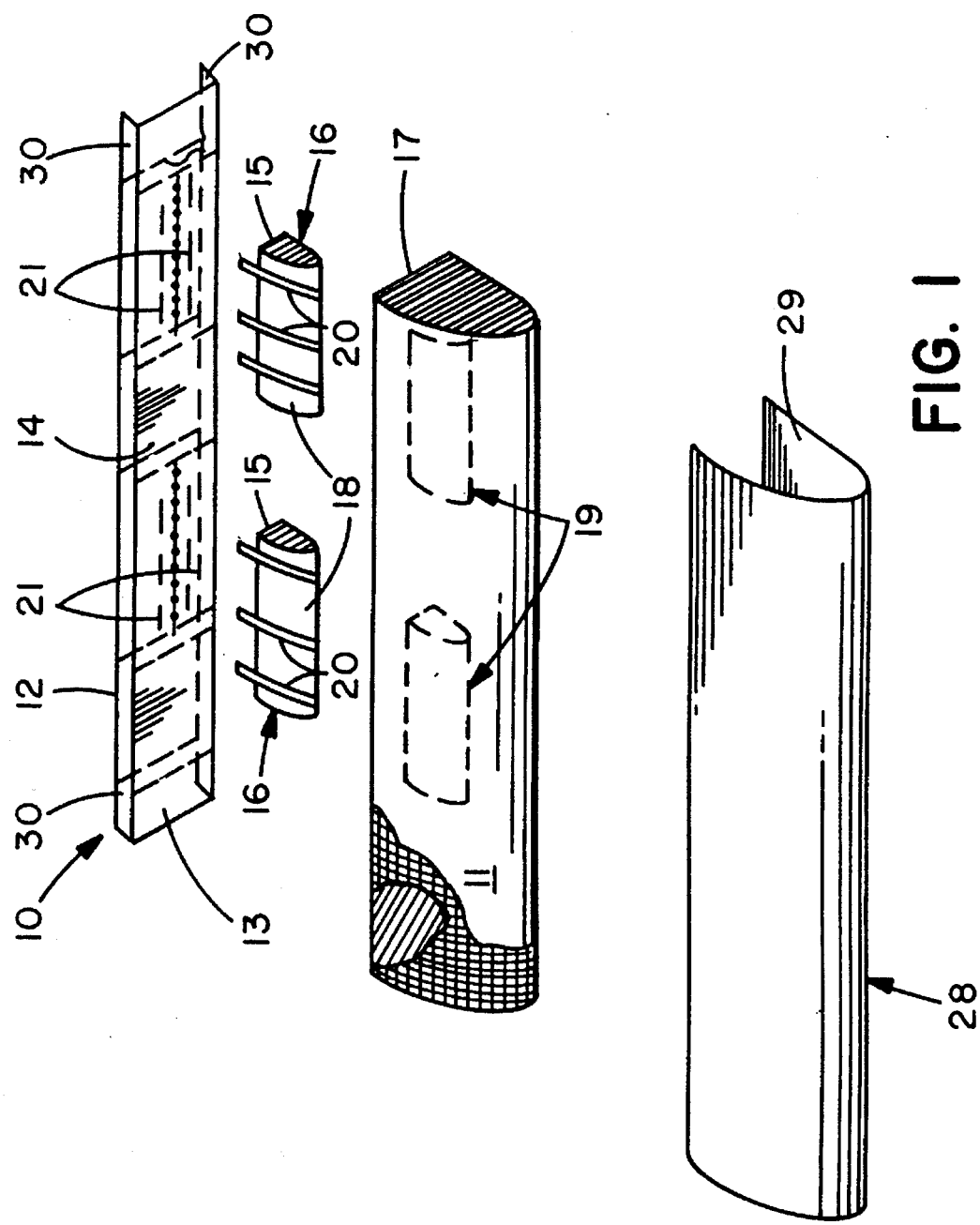
FIG. 1 is a perspective assembly view of a reflector or antenna member, mounting plugs, a leading edge core member or housing and a skin covering, shown in spaced relation for purposed of illustration.

Referring to FIG. 1, the reflective antenna member 10 is the critical functional element of the present assemblies, and the invention is concerned with an improved process for mounting and shielding the antenna member 10 within a protective housing or core member 11 which is radiation-transmissive and contoured for recessed attachment to a surface area of an aircraft, such as a section of the leading edge of a wing member, as illustrated.

The antenna member 10 comprises a panel 12 having a flat target- or reflector-surface 13 carrying a layer 14 of curable bonding adhesive for bonding thereto the flat undersurfaces 15 of reinforcing plugs 16, and for bonding the flat surface 13 of the antenna panel 12 to the flat mating surface 17 of the core member 11.

The outer surfaces of the reinforcing plugs 16 are also coated with a layer 18 of the curable bonding adhesive, and the flat mating surface 17 of the core member 11 is provided with mating recesses 19 which are sized and located to receive and engage the reinforcing plugs 16 which are tension-bound to the reflector surface 13 of the panel 12.

As illustrated by FIG. 1, the reinforcing plugs 16 are provided with a number of spaced draw-down bands 20 of strong, flexible, fibrous, stretch-resistant material, such as Kevlar roving bands, each of which is extended over the plug and through opposed slots or holes 21 in the antenna panel 12. The bands 20 preferably are wrapped around the plugs 16 after the plugs are positioned against the curable adhesive layer 14. The ends of each band 20 are drawn through a pair of opposed holes 21 in the antenna panel 12 for purposes of pressuring the undersurfaces of the plugs 16 against the adhesive layer 14 at a predetermined uniform pressure prior to and during the curing cycle.

Figure 2:
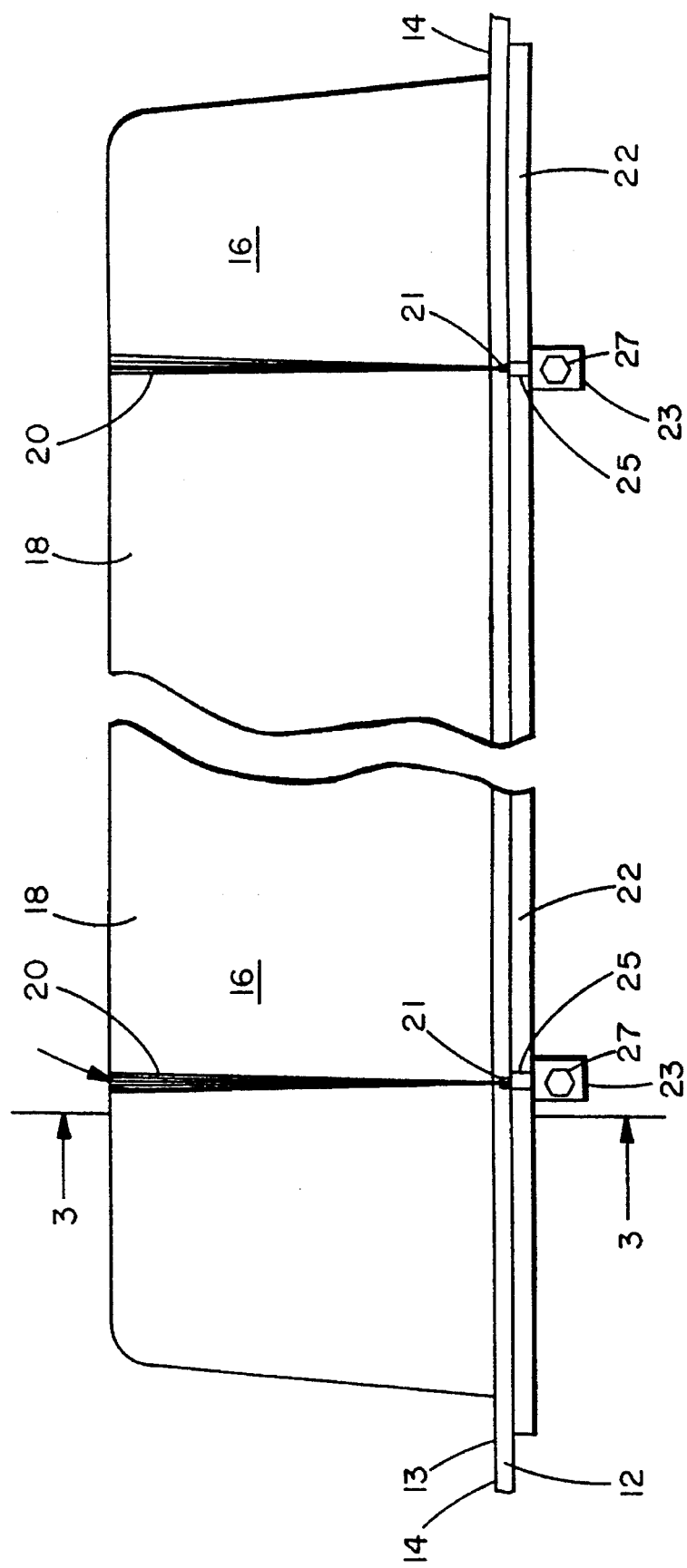
FIG. 2 is a sectional side view of a mounting plug tension-strapped against the reflector surface of an antenna member by engagement of tensioning straps, through the antenna member and through a back-up support member into adjustable torque tensioning devices.
Figure 3:
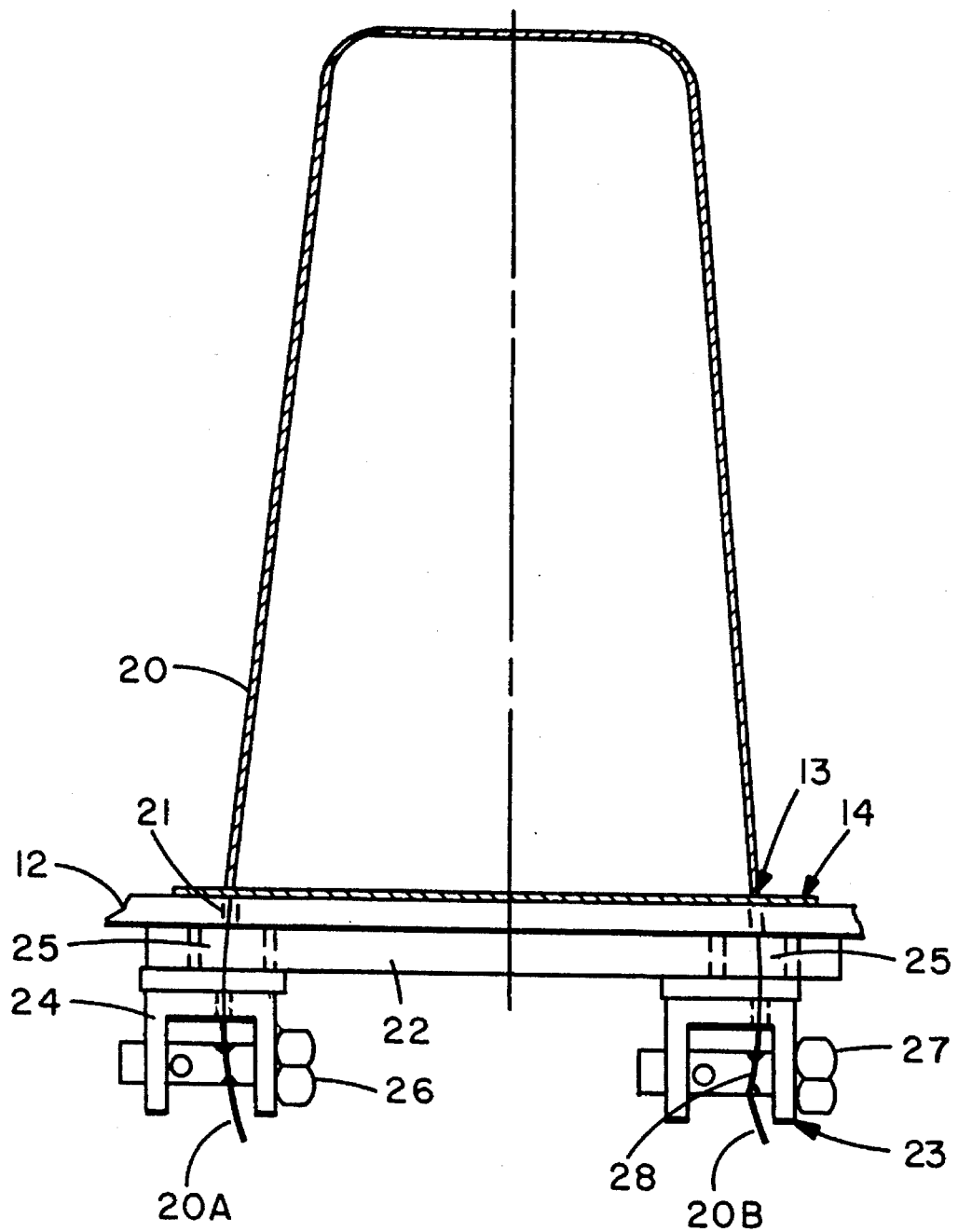
FIG. 3 is a cross-sectional view taken along the line 3—3 of FIG. 2.

As illustrated more clearly by FIGS. 2 and 3, the antenna panel 12 is supported on a tensioning plate 22 having on the undersurface thereof a plurality of spaced pairs of band-tensioning members 23 and 24. Members 24 are friction clamps for holding one end of each band 20, extended through a hole 21 in the panel 12 and through an aligned hole 25 in the tensioning plate 22, and members 23 are torque winding clamps or spools for engaging the other end of each band 20, extended through a companion hole 21 in the panel 12 and through an aligned companion hole 25 in the tensioning plate 22.

Each tensioning member 24 comprises a threaded bolt 26 which can be tightened against the end 20a of a strap band 20, while each tensioning member 23 comprises a threaded torque bolt 27 having a retainer 28, such as a slot, for engaging the other end 20b of the strap band. Turning of each torque bolt 27 causes the end 20b of each band 20 to wind and tighten on the bolt shaft to draw the plug element 16 down against the curable adhesive layer 14 on the antenna panel 12. Generally, each of the bands 20 are drawn down snugly and then each is tightened to a predetermined pressure, such as about 150–250 pounds, to provide the desired overall bond pressure, such as about 20 psi. This is accomplished by tightening the bolts 27 by means of a torque wrench. The torque pressure will depend upon the surface area of the undersurface 15 of the plug member 16 and the number of tie-down bands 20 used for each plug member 16.

The objective is to attach the plug member 16 to the antenna panel 12 under a predetermined pressure without exposing the unit to a cure cycle, whereby said unit can be assembled with the protective core member 11 and subjected to a single cure cycle to cause the plug members 16 to bond to the reflector surface 13 of the antenna panel 12 and to the recessed surfaces of the core member 11 in the areas of the recesses 19, while the flat reflector surface 13 simultaneously bonds to the flat inner surface 17 of the core member 11 to form a strong, separation-resistant core-antenna assembly in a single curing cycle. After curing, the ends of the bands 20 are released from the tensioning members 23 and 24, the tensioning plate 22 is removed from the core-antenna assembly, and the ends of the bands can be severed adjacent the undersurface of the antenna panel 12.

As illustrated by FIG. 1, a protective outer skin 28 such as a heat-resistant flexible composite fabric carrying a layer of curable adhesive on the undersurface 29 thereof, preferably is wrapped over the core member 11 and over the edges 30 of the antenna panel 12 and cured thereto in the single adhesive curing cycle to form a unitary protective-surfaced antenna assembly.

It will be apparent to those skilled in the art that the formation of a strong bond between each of the plug members 16 and the flat reflector surface 13 is essential to the strength and integrity of the present core-antenna assemblies, and that such a strong bond cannot be obtained unless the plug members are compressed against the reflector surface under a predetermined pressure, such as about 20 psi during the cure cycle. Such predetermined high pressure cannot be obtained merely by inserting the plug members 16 into the core recesses 19 and then pressing the antenna panel 12 against the surface 17 of the core member 11 during a curing cycle. Therefore, in the absence of the present invention, the plug members 16 must be pressed against the antenna panel 12 in a first curing cycle, and a second curing cycle is required to bond the plug-antenna panel assembly to the core member 11.

The present contoured core members 11 are conventional lightweight, radiation-transmissive, rigid, strong housing bodies molded from porous, resinous compositions such as phenolic resins or other resin systems conventionally used for the purpose.

The tie-down rovings, straps or bands 20 useful according to the present invention require high tensile strength, high modulus and low % elongation at break. A preferred band material comprises Kevlar (Reg. TM) 49 aromatic polyamide fibers. Other suitable band material comprise Nylon Type 728 polyamide fibers, Dacron (Reg. TM) Type 68 polyethylene terephthalate fibers, graphite fibers, fiberglass fibers and similar strong filaments, fibers and yarns thereof.

The amount of draw-down pressure applied to each of the bands 20 depends upon the area of the undersurface 15 of the plug element 16 and the number of bands 20 used to draw-down each plug element 16. If a total overall pressure of 20 psi is desired, the number of square inches of the area of the surface 15 must be multiplied by 20 and then divided by the number of pressure points applied by the bonds, i.e., two pressure points per band. For a plug having a surface 15 which is 3"×28", the surface area is 84 sq. inch. For a bond pressure of 20 psi the total pressure required is 20×84 or 1680 pounds. Using three bands, each requires a torque pressure of 280 pounds. Using four bands, each requires a torque pressure of 210 pounds.

The curable resinous adhesive compositions useful in producing the present assemblies are the conventional inert compositions which are curable under conditions which are not harmful to the skin 28, the porous core 11 and the plug elements 16, such as resinous compositions curable by means of heat, infrared or ultraviolet radiation, including cross-linkable acrylic pre-polymers, epoxy resins, vinyl polymers and similar curable systems known for such uses. Generally such curing cycles are slow and time-consuming, requiring 10 or more hours of energy application. Therefore the avoidance of a second curing cycle, according to the novel process of the present invention, represents a substantial savings in time and energy-consumption as well as manual processing.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. Process for forming an assembly by compressing a three-dimensional rigid member against a curable adhesive layer present between said member and the surface of a rigid flat support to which said member and an outer housing are to be simultaneously bonded by subjecting the adhesive layer to a curing cycle, which comprises applying at least one length of a strong, high tensile strength non-stretchable fibrous roving over said three-dimensional rigid member and through opposed openings in the rigid support, one at each side of the rigid member, securing each end of the length of roving in an adjustable tensioning member supported beneath the rigid support, tightening the tensioning member to provide a compressed unit having a predetermined compression pressure between said members and the curable adhesive layer, assembling said compressed unit with a housing having a flat surface containing a recess, having an inside surface, for receiving said three-dimensional rigid member, a layer of said curable adhesive being present between the flat surfaces of the housing and of the rigid flat support and between the outer surface of the rigid member and the inside surface of the recess, maintaining said compression while exposing the adhesive layer to a curing cycle to simultaneously cure the adhesive layer of the compressed unit and the adhesive layer between the compressed unit and said housing to form said assembly, and separating the ends of the roving from said tensioning member.

2. Process according to claim 1 in which said three-dimensional rigid member comprises an elongate molded cellular plastic body having a flat undersurface, and said rigid support comprises a flat surface having a larger surface area than that of the undersurface of the three-dimensional body, the flat surface of the support being coated with said curable adhesive layer.

3. Process according to claim 1 in which a sheet of a protective outer skin having a layer of said curable adhesive on the undersurface thereof is applied over the outer surface of said housing prior to the curing cycle, the exposure to the curing cycle simultaneously bonding said protective outer skin to the outer surface of said housing.

4. Process according to claim 2 which comprises applying a plurality of lengths of said roving over the elongate molded cellular plastic body, spaced along the length thereof, and tensioning each of said roving lengths to provide the predetermined compression pressure.

* * * * *